(12) United States Patent
Satkin

(10) Patent No.: US 10,235,800 B2
(45) Date of Patent: Mar. 19, 2019

(54) SMOOTHING 3D MODELS OF OBJECTS TO MITIGATE ARTIFACTS

(71) Applicant: Google LLC, Mountain View, CA (US)

(72) Inventor: Scott Benjamin Satkin, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/835,683

(22) Filed: Dec. 8, 2017

(65) Prior Publication Data

US 2018/0101981 A1 Apr. 12, 2018

Related U.S. Application Data

(63) Continuation of application No. 14/877,414, filed on Oct. 7, 2015, now Pat. No. 9,875,575.

(51) Int. Cl.
*G06T 17/05* (2011.01)
*G06T 17/20* (2006.01)
*G06T 19/20* (2011.01)
*H04N 13/239* (2018.01)
*H04N 13/00* (2018.01)

(52) U.S. Cl.
CPC .............. *G06T 17/05* (2013.01); *G06T 17/20* (2013.01); *G06T 19/20* (2013.01); *H04N 13/239* (2018.05); *G06T 2219/2021* (2013.01); *H04N 2013/0081* (2013.01)

(58) Field of Classification Search
CPC ............ G06T 7/50–7/596; G06T 17/00–17/30
See application file for complete search history.

(56) References Cited

U.S. PATENT DOCUMENTS

| | | | |
|---|---|---|---|
| 5,886,702 A | 3/1999 | Migdal et al. | |
| 9,646,410 B2 * | 5/2017 | Collet Romea | G06T 15/205 |
| 2007/0126876 A1 | 6/2007 | Gallagher et al. | |
| 2012/0075297 A1 | 3/2012 | Carbonera et al. | |
| 2013/0101157 A1 | 4/2013 | Li et al. | |
| 2013/0271459 A1 | 10/2013 | Gary | |
| 2014/0015929 A1 | 1/2014 | Hong et al. | |
| 2015/0206337 A1 * | 7/2015 | Roimela | G06T 7/60 345/419 |
| 2015/0235429 A1 | 8/2015 | Miller et al. | |
| 2016/0335809 A1 * | 11/2016 | Forutanpour | G06T 7/50 |

OTHER PUBLICATIONS

Paul Debevec, Yizhou Yu and George Borshukov; Efficient View-Dependent Image-Based Rendering with Projective Texture-Mapping; 1998; 13 pages.
Diego Nehab; Szymon Rusinkiewicz; James Davis and Ravi Ramamoorthi; Efficiently Combining Positions and Normals for Precise 3D Geometry; 2005; 8 pages.
Thouis Raymond Jones: Feature Preserving Smoothing of 3D Surface Scans; Sep. 2003; 70 pages.

(Continued)

*Primary Examiner* — Daniel F Hajnik
(74) *Attorney, Agent, or Firm* — Lerner, David, Littenberg, Krumholz & Mentlik, LLP

(57) ABSTRACT

A system and method is provided for smoothing portions of a 3D model of an object based on the likelihood of a portion being an accurate representation of the surface of the object, and based on whether the surface of the object according to the model is relatively jagged or relatively smooth.

20 Claims, 7 Drawing Sheets

(56) References Cited

OTHER PUBLICATIONS

Tolga Tasdizen; Ross Whitaker; Paul Burchard; Stanley Osher; Geometric Surface Smoothing via Anisotropic Diffusion of Normals; 2002; 3 pages.
Thouis R. Jones; Fredo Durand; Mathieu Desbrun; Non-Iterative, Feature-Preserving Mesh Smoothing; 2003; 7 pages.
David T. Guinnip; Shuhua Lai; Ruigang Yang; View-Dependent Textured Splatting for Rendering Live Scenes; 2006; 10 pages.
Ruano Susana et al: "Aerial video georegistration using terrain models from dense and coherent stereo matching", Optomechatronic Micro/Nano Devices and Components III : Oct. 8-10, 2007, Lausanne, Switzerland; [Proceedings of SPIE, ISSN 0277-786X], SPIE, Bellingham, Wash, vol. 9089, Jun. 18, 2014 (Jun. 18, 2014), pp. 90890V-90890V, XP060037330, DOI: 10.1117/12.2053034, ISBN: 978-1-62841-730-2.
Keith N Snavely: "Scene reconstruction and visualization from Internet photo collections," Jan. 1, 2008 (Jan. 1, 2008), XP055156702, ISBN: 978-1-10-900412-0. Retrieved from the Internet: <http://search.proquest.com/docview/304440924>.
International Search Report and Written Opinion for PCT Application No. PCT/US2016/055692, dated Feb. 3, 2017.
Wang J., et al. "Feature-Preserving Surface Reconstruction From Unoriented, Noisy Point Data." Computer Graphics Forum. vol. 32. No. 1. Blackwell Publishing Ltd, 2013.
Remondino, Fabio. "Heritage Recording and 3D Modeling with Photogrammetry and 3D Scanning." Remote Sensing 3.6 (2011): 1104-1138.
Sinha, Sudipta N., et al. "Interactive 3D Architectural Modeling from Unordered Photo Collections." ACM Transactions on Graphics (TOG). vol. 27. No. 5 ACM, 2008.
Agarwal, Sameer, et al, "Reconstructing rome", Computer 43.6 (Jun. 2010): 40-47.
Furukawa, Yasutaka, and Jean Ponce. "Accurate, dense, and robust multiview stereopsis." IEEE transactions on pattern analysis and machine intelligence 32.8 (Aug. 2010): 1362-1376.
Waechter, Michael, Nils Moehrle, and Michael Goesele. "Let There Be Color! Large-Scale Texturing of 30 Reconstructions." ECCV (5). 2014, pp. 836-850.

\* cited by examiner

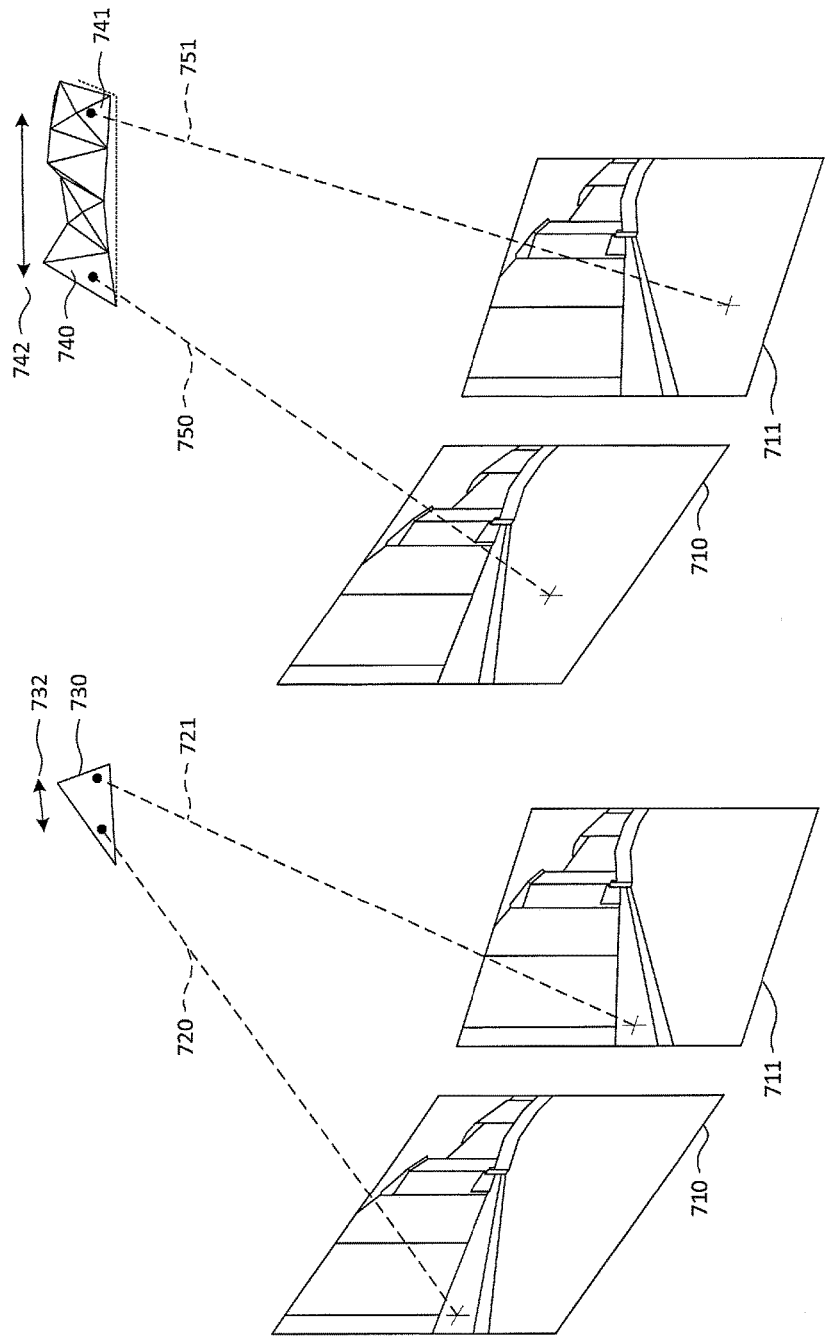

… (US 10,235,800 B2)

SMOOTHING 3D MODELS OF OBJECTS TO MITIGATE ARTIFACTS

CROSS-REFERENCE TO RELATED APPLICATION

The present application is a continuation of U.S. patent application Ser. No. 14/877,414, filed on Oct. 7, 2015, the disclosure of which is incorporated herein by reference.

BACKGROUND OF THE INVENTION

Certain panoramic images of geographic scenes are associated with information relating to the geographic location and orientation from which the various portions of the image was captured. For example, each pixel of the image may be associated with data that identifies a ray that extends from the geographic location from which the image was captured to the portion of the surface of an object (if any) whose appearance is represented by the visual characteristics of the pixel.

Panoramic images such as the foregoing may be used to create a three-dimensional model of the surfaces of the object captured in the image. For instance, stereographic triangulation may be used to generate a model from two images of the same scene captured from different geographic locations. Models may also be created using other techniques, such as using a laser-range finder to create depth map data that is associated with the image. Such data may be used to create a collection of polygons whose vertices are associated with the 3D geographic-location of portions of the surfaces represented by the model. The polygons may be textured by projecting the image data onto the model.

The aforementioned models may be displayed to users via an electronic display. For example, a user may use a computer to download a 3D model and display it from different vantage points that are selected by the user.

BRIEF SUMMARY OF THE INVENTION

Some aspects of the disclosure provide a system that includes one or more computing devices and memory storing instructions executable by the processor and a model associated with locations on the surface of a geographic feature. The instructions may include: determining a confidence value for a portion of the model, where the confidence value is associated with the likelihood of the locations of the portion being an accurate representation of the surface of the geographic feature; determining, with the one or more computing devices for a portion of the model, an eccentricity value based on the jaggedness of the surface according to the locations of the model; modifying a location of the portion based on the confidence value and eccentricity value; and providing the modified portion of the model.

Some aspects of the disclosure also provide a method of determining a model of a geographic feature. The method may include: receiving, with one or more computing devices, a model having a plurality of locations associated with the surface of a geographic feature; determining, with the one or more computing devices and for a portion of the model, a confidence value, where the confidence value is associated with the likelihood of the locations of the portion being an accurate representation of the surface of the geographic feature; determining, with the one or more computing devices and for a plurality of locations in the portion, an eccentricity value based on the distance between each location relative to a reference shape and the difference between said distance and the distance between neighboring locations and the reference shape; modifying, with the one or more computing devices, a plurality of locations of the portion based on the confidence value and the eccentricity value; and providing, with one or more computing devices, the modified portion of the model.

Some aspects of the disclosure further provide a non-transitory computing-device readable storage medium on which computing-device readable instructions of a program are stored. The instructions, when executed by one or more computing devices, cause the one or more computing devices to perform a method. The method may include: receiving a plurality of polygons representing a three-dimensional model of the surface of a geographic object, the model being based on a comparison of a first image and a second image capturing the surface of the object, where each image is captured from a different camera location; determining a confidence value for a portion of the model, where the confidence value is associated with the likelihood of the locations of the polygons of the portion being an accurate representation of the surface of the geographic feature; determining an eccentricity value for the portion, where the eccentricity value is based on the difference between the distance of a first vertex of a polygon to a reference plane and the distance of at least one other vertex of the polygon to the reference plane; and smoothing the portion of the model by decreasing the distances between the vertices of a plurality of the polygons of the portion.

BRIEF DESCRIPTION OF THE DRAWINGS

FIGS. 7A and 7B are examples of determining residual errors associated with imagery and models.

DETAILED DESCRIPTION

Overview

The technology relates to removing or reducing artifacts that might arise when estimating and constructing a three-dimensional (3D) model of geographic features. For instance, a portion of the model may be smoothed if the quality of that portion of the model is suspect, which may result in a more positive experience when a user interacts with the model. The amount of smoothing in a particular portion may be proportional to the eccentricities in the portion and inversely proportional to confidence in the accuracy of the model at the portion.

Figure 2:
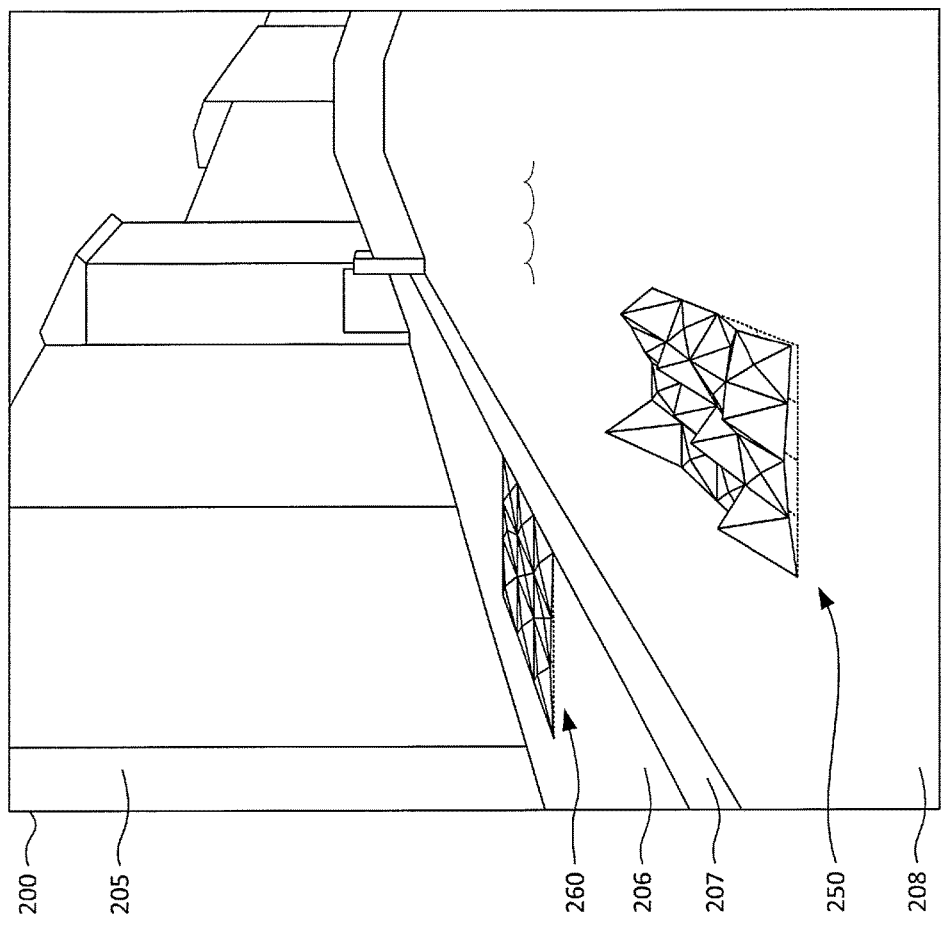
FIG. 2 is an example of imagery and a model of the surfaces of objects appearing in the imagery.

By way of example, FIG. 2 shows a portion of a panoramic image that includes buildings, a sidewalk and a canal. A 3D model, represented by polygons having vertices at geographic locations (e.g., latitude/longitude/altitude), may be generated from the image. By way of further example, the model may be generated by comparing the image shown in the figure with another image of the same features taken from a different vantage point, and then using stereo triangulation to estimate the location of the surfaces that appear in both images. FIG. 2 illustrates two portions of such a model, namely, one portion is associated with the geometry of a portion of the sidewalk's surface and another portion is associated with the geometry of the surface of the water in the canal. The quality of the model may vary from portion to portion, e.g., some of portions of the model may indicate that surface is relatively jagged when it is actually relatively smooth.

Figure 3:
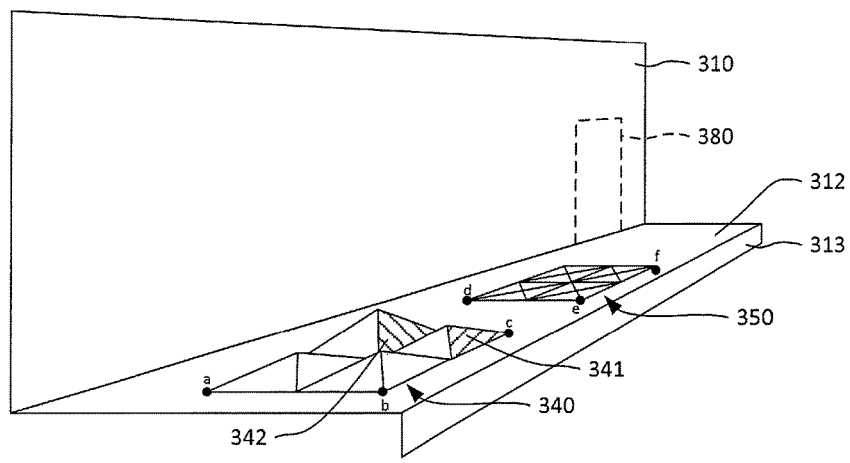
FIG. 3 is an example of a model of surfaces.

The system may determine a confidence value that reflects the likelihood of a particular portion of the 3D model being an accurate representation of the surface of a geographic feature. For instance, the confidence value associated with a polygon may be generated by determining global optimums for the model and then calculating the polygon's deviation from the optimal values. By way of example and as shown in FIG. 3, the system may determine that the positions of the vertices in the model generally define three planes. The system may then use those planes to estimate the actual location of the surfaces, and the distance that the vertices are moved towards the estimated locations may be based on the confidence value. Object recognition and non-planar shapes may also be used to estimate the actual location of surfaces and determine confidence values.

Figure 4:
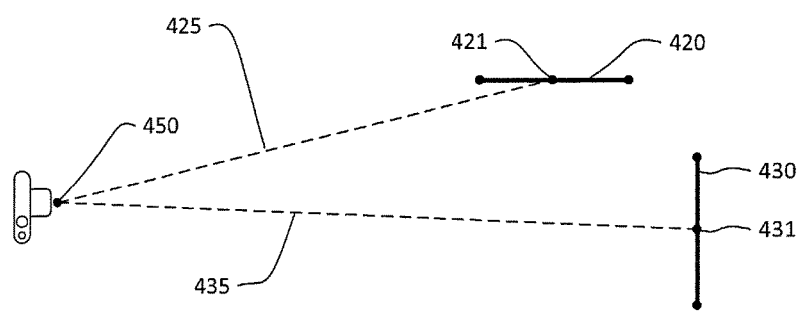
FIG. 4 is an example of determining a confidence value based on the orientation of surfaces of a model.

The orientation of a surface relative to the camera angle may also affect the confidence value. For example and as shown in FIG. 4, planes generally orthogonal to the camera angle may have a higher confidence value than planes generally parallel to the camera angle. The distance from the camera to the surface represented in the model may also be used to determine confidence values.

Figure 5:
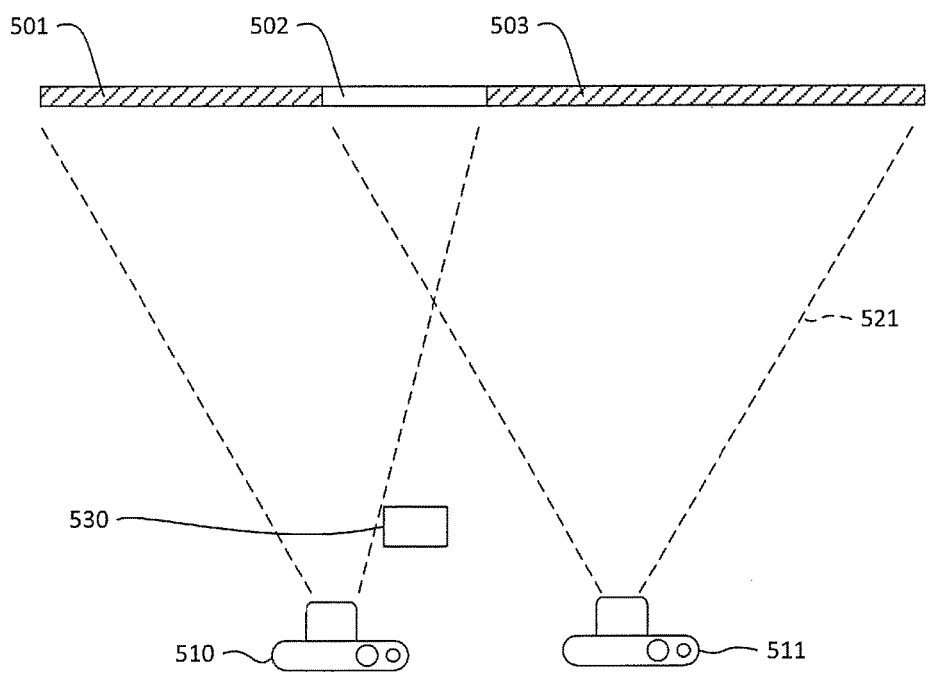
FIG. 5 is an example of determining a confidence value based on how imagery was captured.

In addition, confidence values may be based on the method used to generate the model. As shown in FIG. 5, portions that are generated based on information from two images may be assigned a higher confidence value than portions generated from a single image. If a portion was generated from a constellation of laser-measured depths, the assigned confidence value may be even higher.

Residual errors may also be used to calculate a confidence value. By way of example, FIG. 7 shows two images of the same scene taken from the different vantage points, each of which was used to calculate a 3D model. Each pixel of the image may be associated with a camera angle ray. If the model is perfect, the rays of different pixels showing the same location of a surface should intersect the model at the same spot. In that regard, the confidence value may be inversely correlated with the distance between the spots.

Other techniques for calculating the confidence value may also be used. Moreover, the different techniques of determining confidence values may be combined to form a single confidence value.

The eccentricity of a model may also be determined. By way of example, FIGS. 6A and 6B chart the distance of a row of eight vertices relative to a reference plane that reflects an estimate of the actual location of the relevant surface. In the portion represented by FIG. 6A, the distances tend to be relatively minor and continuously increase or decrease. In the portion represented by FIG. 6B, the difference in distances are larger and more varied, e.g., more jagged. As a result, the system may determine an eccentricity value based on the magnitude and frequency with which the values change from one vertex to the next.

Figure 8:
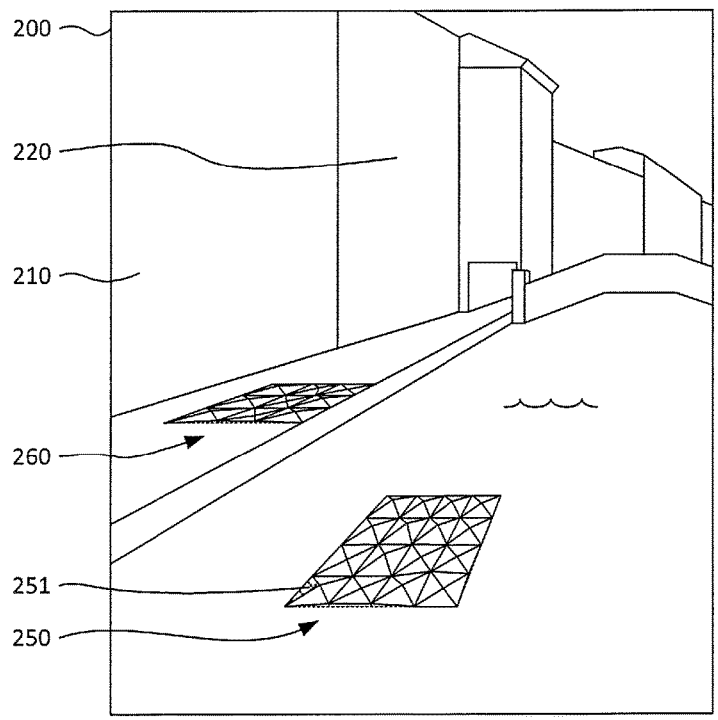
FIG. 8 is an example of the imagery of FIG. 1 and a model of the surfaces of objects appearing in the imagery.

The confidence and eccentricity values may be used to determine the amount of smoothing that should be applied to a portion of the model. By way of example, the distance that vertices are moved closer to a reference shape may be proportional to the eccentricity value and inversely proportional to the confidence value. As shown in FIG. 8, the vertices of the polygons representing the canal may be smoothed so that most neighboring vertices are closer to each other and a reference plane, but not so smoothed that all of the polygons are aligned in the same plane. Different weights may be applied to the confidence values and eccentricity values when determining the amount of smoothing.

Figure 9:
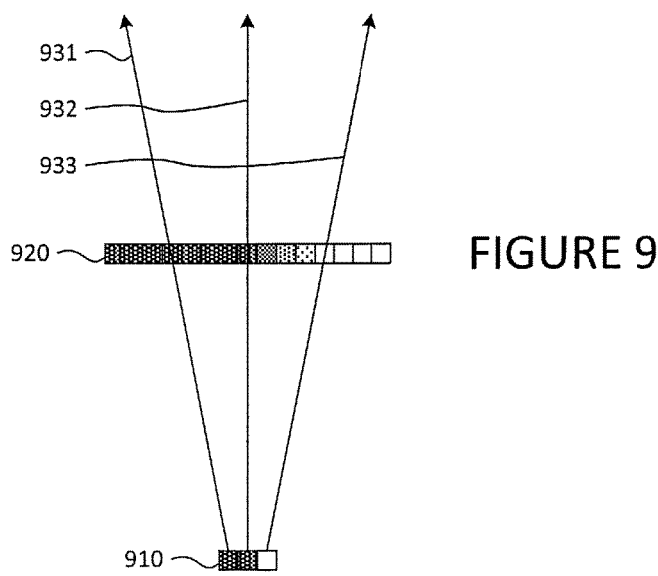
FIG. 9 is an example of projecting visual information onto a model.

The system may apply a texture to the model after it is smoothed. By way of example and as shown in FIG. 9, the pixels of the images may be projected onto the smoothed model by identifying the polygon that is first intersected by the pixel's associated ray. The visual characteristics of each pixel may be stretched onto a polygon, e.g., the texture between intersection points may be interpolated.

Users may interact with the model in a number of ways, such as by viewing the model from vantage points that are different from the vantage points from which the model was generated. Inaccuracies in the model may become more obvious and distracting when users view the model from such vantage points, and smoothing the model as described herein may result in images that look more pleasant to users.

Example Systems

Figure 1:
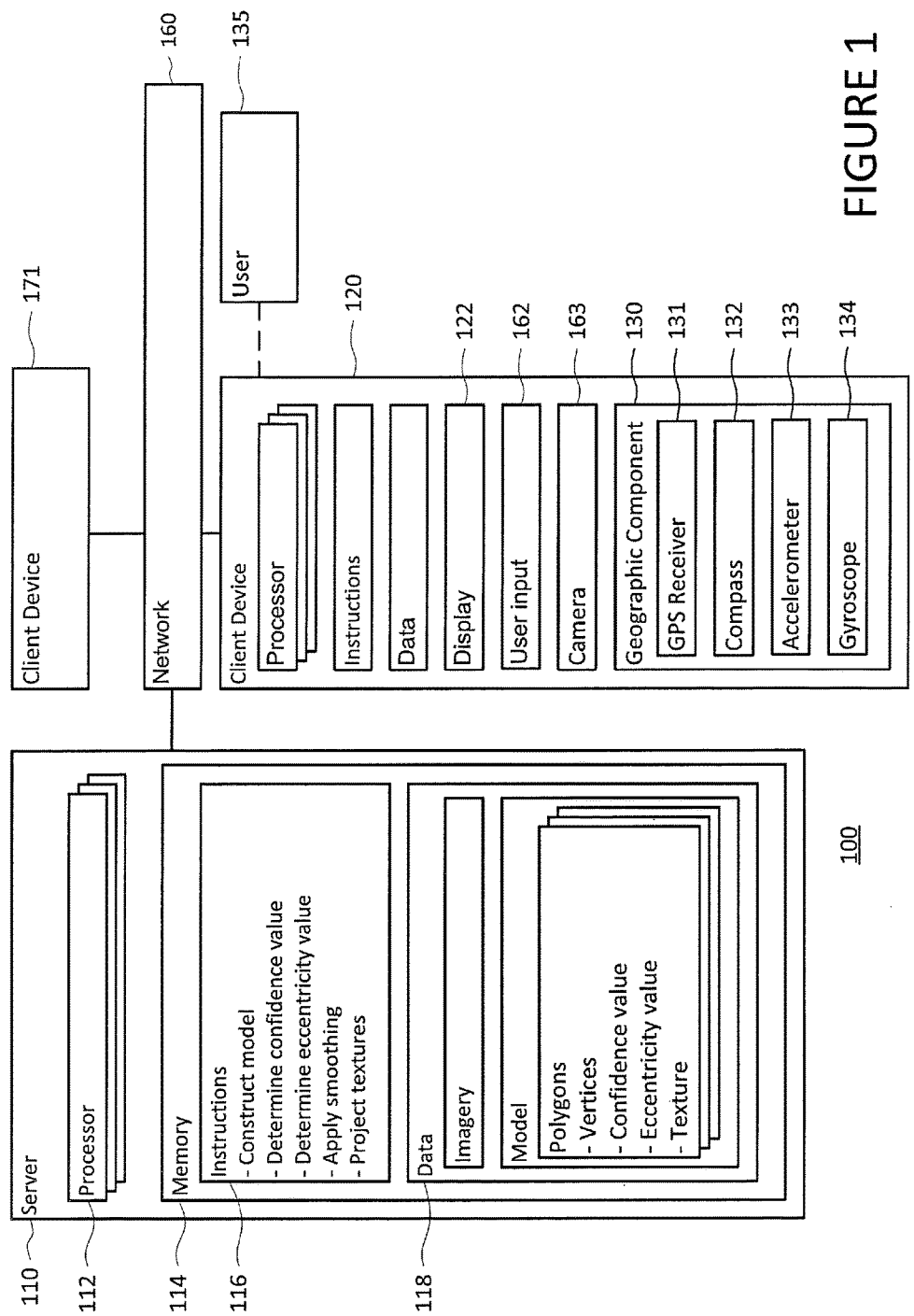
FIG. 1 is a functional diagram of a system in accordance with aspects of the disclosure.

FIG. 1 illustrates one possible system 100 in which the aspects disclosed herein may be implemented. In this example, system 100 may include computing devices 110 and 120. Computing device 110 may contain one or more processors 112, memory 114 and other components typically present in general purpose computing devices. Although FIG. 1 functionally represents each of the processor 112 and memory 114 as a single block within device 110, which is also represented as a single block, the system may include and the methods described herein may involve multiple processors, memories and devices that may or may not be stored within the same physical housing. For instance, various methods described below as involving a single component (e.g., processor 112) may involve a plurality of components (e.g., multiple processors in a load-balanced server farm). Similarly, various methods described below as involving different components (e.g., device 110 and device 120) may involve a single component (e.g., rather than device 120 performing a determination described below, device 120 may send the relevant data to device 110 for processing and receive the results of the determination for further processing or display).

Memory 114 of computing device 110 may store information accessible by processor 112, including instructions 116 that may be executed by the processor. Memory 114 may also include data 118 that may be retrieved, manipulated or stored by processor 112. Memory 114 may be any type of storage capable of storing information accessible by the relevant processor, such as media capable of storing non-transitory data. By way of example, memory 114 may be a hard-disk drive, a solid state drive, a memory card, RAM, DVD, write-capable memory or read-only memory. In addition, the memory may include a distributed storage system where data, such as data 118, is stored on a plurality of different storage devices which may be physically located at the same or different geographic locations.

The instructions 116 may be any set of instructions to be executed by processor 112 or other computing device. In that regard, the terms "instructions," "application," "steps" and "programs" may be used interchangeably herein. The instructions may be stored in object code format for immediate processing by a processor, or in another computing device language including scripts or collections of independent source code modules, that are interpreted on demand or compiled in advance. Functions, methods and routines of the instructions are explained in more detail below. Processor 112 may be any conventional processor, such as a commercially available CPU. Alternatively, the processor may be a dedicated component such as an ASIC or other hardware-based processor.

Data 118 may be retrieved, stored or modified by computing device 110 in accordance with the instructions 116. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The computing device 110 may be at one node of a network 160 and capable of directly and indirectly communicating with other nodes of network 160. Although only a few computing devices are depicted in FIG. 1, a typical system may include a large number of connected computing devices, with each different computing device being at a different node of the network 160. The network 160 and intervening nodes described herein may be interconnected using various protocols and systems, such that the network may be part of the Internet, World Wide Web, specific intranets, wide area networks, or local networks. The network may utilize standard communications protocols, such as Ethernet, Wi-Fi and HTTP, protocols that are proprietary to one or more companies, and various combinations of the foregoing. As an example, computing device 110 may be a web server that is capable of communicating with computing device 120 via the network 160. Computing device 120 may be a client computing device, and server 110 may display (or provide for display) information by using network 160 to transmit and present information to a user 125 of device 120 via display 122. Although certain advantages are obtained when information is transmitted or received as noted above, other aspects of the subject matter described herein are not limited to any particular manner of transmission of information.

Computing device 120 may be configured similarly to the server 110, with a processor, memory and instructions as described above. Computing device 120 may be a personal computing device intended for use by a user and have all of the components normally used in connection with a personal computing device such as a central processing unit (CPU), memory storing data and instructions, a display such as display 122 (e.g., a monitor having a screen, a touch-screen, a projector, a television, or other device that is operable to display information), user input device 162 (e.g., a mouse, keyboard, touchscreen, microphone, etc.), and camera 163.

Computing device 120 may also be a mobile computing device capable of wirelessly exchanging data with a server over a network such as the Internet. By way of example only, device 120 may be a mobile phone or a device such as a wireless-enabled PDA, a tablet PC, a wearable computing device or a netbook that is capable of obtaining information via the Internet. The device may be configured to operate with an operating system such as Google's Android operating system, Microsoft Windows or Apple iOS. In that regard, some of the instructions executed during the operations described herein may be provided by the operating system whereas other instructions may be provided by an application installed on the device. Computing devices in accordance with the systems and methods described herein may include other devices capable of processing instructions and transmitting data to and from humans and/or other computers including network computers lacking local storage capability and set top boxes for televisions.

Computing device 120 may include a component 130, such as circuits, to determine the geographic location and orientation of the device. For example, client device 120 may include a GPS receiver 131 to determine the device's latitude, longitude and altitude position. The component may also comprise software for determining the position of the device based on other signals received at the client device 120, such as signals received at a cell phone's antenna from one or more cell phone towers if the client device is a cell phone. It may also include a magnetic compass 132, accelerometer 133 and gyroscope 134 to determine the direction in which the device is oriented. By way of example only, the device may determine its pitch, yaw or roll (or changes thereto) relative to the direction of gravity or a plane perpendicular thereto.

Server 110 may store map-related information, at least a portion of which may be transmitted to a client device. The map information is not limited to any particular format. For instance, the map data may include bitmap images of geographic locations such as photographs captured by a satellite or aerial vehicles.

Server 110 may also store imagery such as, by way of example only, a flat photograph, a photo sphere, or a video of scenery. The imagery may be captured and uploaded by end users for the purpose of making the photo accessible for later access or to anyone searching for information related to the feature. In addition to the image data captured by a camera, individual items of imagery may be associated with additional data, such as date of capture, time of day of capture, the geographic orientation (e.g., camera angle) and location of capture (e.g., latitude, longitude and altitude).

Portions of the imagery may be associated with additional information, including a model of the geographic location of features that appear within the imagery. For instance, the model may identify the location of surfaces of objects captured in a panoramic image. The location of the surfaces may be stored in memory in different ways, e.g., a constellation of points whose position is defined as a solid angle and distance from a fixed location (e.g., orientations and distances from the point from which the imagery was captured) or geographically-located polygons whose vertices are expressed in latitude/longitude/altitude coordinates. The system and method may further translate locations from one reference system to another, such as generating a model of geographically-located polygons from a constellation of points whose locations were captured directly with the use of a laser-range finder or generated from images by use of stereographic triangulation. Locations may be expressed in other ways as well, and depend on the nature of the application and required precision. By way of example only, geographic locations may be identified by a street address, x-y coordinates relative to edges of a map (such as a pixel position relative to the edge of a street map), or other reference systems capable of identifying geographic locations (e.g., lot and block numbers on survey maps). A geographic location may also be described by a range, e.g., the location of an object may be described by a range, or discrete series, of latitude/longitude/altitude coordinates.

Example Methods

Operations in accordance with a variety of aspects of the invention will now be described. It should be understood that the following operations do not have to be performed in the precise order described below. Rather, various steps can be handled in different order or simultaneously.

A model of the location of the surfaces of geographically-located objects may be generated. For purposes of illustration, FIG. 2 shows a portion of a panoramic image 200 that includes buildings 205, sidewalk 206, curb 207 and canal 208. The figure also shows one portion 260 of a model that was generated for a portion of the sidewalk 206 and another portion 250 of a model that was generated for a portion of the surface of the water in the canal 208. The model may be represented by polygons having vertices at the estimated geographic locations of the surfaces of the relevant objects (e.g., latitude/longitude/altitude). For example, server 110 may have determined the locations of the polygons by comparing the image shown in FIG. 2 with another image of the same features taken from a different vantage point, and then applied stereo triangulation to estimate the location of surfaces appearing in both images.

The quality of the model may vary from portion to portion. For instance, sidewalk portion 260 may be quite accurate when determined by stereo triangulation if the sidewalk's appearance remained relatively static between the two images. In contrast, canal portion 250 may be relatively inaccurate and jagged, even if the surface of the water is relatively smooth, because moving water can reflect light in different ways and thus have an outsized effect on a model generated from stereo triangulation.

The system may determine a confidence value that reflects the likelihood of a particular portion of the model being an accurate representation of the location of a surface of a geographic feature. For ease of reference, confidence values that reflect a higher or greater likelihood of accuracy are referred to herein as being higher or greater than other confidence values. However, the actual number stored in memory for a high confidence value may be lower than the actual number stored in memory for a high confidence value, e.g., a value of 0 may be stored in memory to represent a high confidence value and a value of 1 may be stored in memory to represent a high confidence value. Moreover, the fact that a confidence value is referred to herein as being proportional to another value does not necessarily mean that the confidence value is directly proportional to the other value. For instance, if the confidence value of a first portion of the model is twice that of a second portion, that does not necessarily mean that the first portion is twice as likely to be an accurate representation of a surface as the second portion. Rather, a confidence value is proportional to a certain value if at least some increases in the certain value are associated with increases (or decreases, if inversely proportional) in the confidence value, and the extent of the increase (or decrease) in the confidence value is related to the extent of the increase in the certain value.

The confidence value may be associated with any portion of the model. For example, a separate confidence value may be calculated and stored for each individual vertex. Alternatively or in addition, a separate confidence value may be calculated and stored for each individual polygon. Yet further, a single confidence value may be calculated and stored for regions of the model that include many polygons.

In at least one aspect, the confidence value may be determined by determining global optimums for the model and then calculating the model's deviation from the optimal values. For instance, the system may assume that certain surfaces, such as those at ground level in a city, are more likely to be smooth and relatively planar. In that regard, the system may determine the confidence value for a portion of the model based on how well the portion corresponds with a reference plane whose location is based on the estimated location of the relevant surface.

By way of example, FIG. 3 illustrates two portions 330 and 340 of a model that was generated for the surface of building 310, sidewalk 312 and curb 313 (only the portions corresponding with sidewalk 312 are shown). Based on an analysis of the locations of the polygons of the model, the server 110 may determine that the surfaces generally correspond with three best-fitting planes: a first vertical plane for building 310, a horizontal plane for sidewalk 312, and a second vertical plane for curb 313. The system may use these planes as a reference when calculating the confidence value of the model. For instance, if the reference plane for portion 340 is the plane defined by points a-b-c, and if the reference plane for portion 350 is the plane defined by points d-e-f, then the confidence value determined for polygon 341 would be greater than the confidence value determined for polygon 342 because the orientation and location of polygon 342 deviates more from the reference plane than polygon 341. Moreover, the confidence values of polygons 341 and 342 would both be less than the confidence values of the polygons of portion 350, which lie exactly in the reference plane.

Recognizing the types of objects associated with the model may also be used to determine the confidence value. By way of example, the system may analyze whether the visual characteristics of the image or the general shape of a portion is consistent with the appearance or shape of a common object, such as a fire hydrant. If so, the confidence value may be based on how closely the relevant portion conforms to the shape of a fire hydrant. By way of further example, if the system recognizes doors and windows, such as door 380 in FIG. 3, the system may determine that the model includes the side of a building and may thus use a vertical flat surface as a reference for calculating confidence values.

The orientation of a surface relative to the camera angle may also be used to determine the confidence value. By way of example, FIG. 4 shows a top-down view of polygons 420 and 430, their center points 421 and 431, lines 425 and 435 extending from the location from which the model was generated (e.g., the location from which the associated image was captured) to the center points 421 and 431, and the solid angle between lines 425 and 435 and the plane defined by the polygons' vertices, respectively (hereafter, "orientation angle"). The system may calculate a confidence value for each polygon that is proportional to how close the orientation angle is to orthogonal. For instance, because the orientation angle of polygon 430 is relatively orthogonal and the orientation angle of polygon 420 is relatively acute, the confidence value of polygon 430 may be relatively high and confidence value of polygon 430 may be relatively low.

The distance of a surface from the point from which the surface location was modeled may also be used to determine a confidence value. For instance and as shown in FIG. 4, because the center 421 of polygon 420 is closer to capture point 450 than the center 431 of polygon 430, the confidence value of polygon 420 may be set higher than the confidence value of polygon 430.

The system may also base the confidence value on whether portions of the model were obscured from view. As shown in FIG. 5, the image of an object's surface may be captured from two different vantage points 510 and 511. Portions 501 and 502 of the surface may be captured from vantage point 510, but portion 503 may be obscured from view by object 530. Portion 501 may not be obscured from vantage point 511, but the camera's angle of view 521 may prevent the camera from capturing that portion. As a result, the portion of the model associated with surface portion 502 may have been determined from stereographic triangulation whereas the portions of the model associated surface portions 501 and 503 may have been determined based on information contained in a single image. The system may assign confidence values that are proportional to the number of vantage points used to capture the image, thus resulting in the portion of the model associated with surface portion 502 having a higher confidence value than the portion of the model associated with surface portions 501 and 503.

Residual errors may also be used to calculate a confidence value. In the example shown in FIGS. 7A and 7B, client device 120 captured images 710 and image 711 of the same scene from the same capture point but from different camera angles in quick succession. As noted above, a model of the surfaces of objects captured in the image may be generated from each image. Moreover, each pixel of the image may be associated with a camera angle, e.g., associated with data defining a ray that extends from the camera to the portion of the surface that was captured by that pixel. The camera angle data may be based on information provided by geographic component 130, such as the cardinal direction provided by compass 132 and orientation data provided by gyroscope 134. The system may identify pixels in the two images that are likely to have captured the same portion of the same surface of an object based on visually similar characteristics and the camera angle data (hereafter, "matching pixels"). If the model is perfect, the rays of the matching pixels should point to the same spot on the model. In that regard and as shown in FIG. 7A, if the portion of the model associated with the sidewalk 200 of FIG. 2 and ray data are relatively accurate, the points at which the rays first intersect the model should be relatively close to one another, e.g., in the same polygon 730 at a relatively small distance 732 from each other.

However, if the model is inaccurate, the camera angles of matching pixels may point to very different spots on the model. By way of comparison to FIG. 7A, FIG. 7B illustrates the rays 750 and 751 of matching pixels of the canal 208 of FIG. 2. If the model derived from the images is relatively inaccurate due to the rapidly-changing visual appearance of water surfaces, the locations at which the rays first intersect the model may be in different polygons 740 and 741 and the distance 742 between those points may be relatively large. As a result, the system may assign proportionally higher confidence values to polygon 730 than the confidence values assigned to polygons 740 and 741. The system may also assign lower confidence values to the polygons between or proximate to polygons 740 and 741.

Other techniques for calculating a confidence value may also be used. For example, confidence values may be calculated based on deviations of the currently derived 3D model from prior models of the geographic features. Confidence values may also be based on the method used to generate the model. For instance, locations on the model that were measured directly (e.g., with a laser-range finder) may be assigned higher confidence values than locations that were determined based on stereographic triangulation. Modeling techniques based on image analysis that are typically less accurate than stereographic triangulation may result in even lower confidence values.

The different techniques for determining confidence values may be combined to form a single confidence value. For example, the system may determine confidence values for a polygon by applying all of the foregoing techniques and then average all of different confidence values together. The average may be weighted, e.g., some techniques may have a greater effect on the average than others may. Alternatively, the confidence value of each polygon may be expressed (and compared with other polygons) as a series of values, where each value reflects a single technique.

Figure 6A:
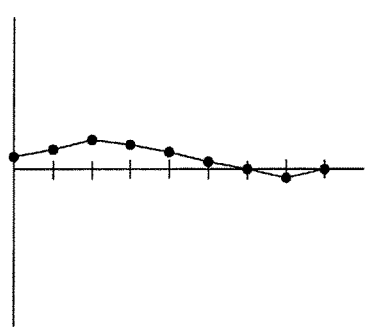
FIGS. 6A and 6B are graphs of the distance between locations associated with a model and a reference plane.
Figure 6B:
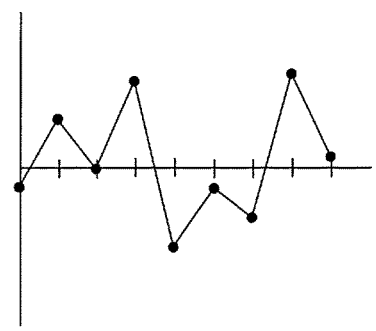

The eccentricity of a 3D model portion may also be determined. By way of example, the vertical axis in FIGS. 6A and 6B represents the distance of a vertex of a polygon from a reference plane, where positive and negative values indicate that the vertex is above or below (respectively) the plane. Each tick mark and point along the horizontal axis identifies a single vertex; the lines between each point represent the edge of a polygon. In the portion of the model represented by FIG. 6A, the changes in the distance between neighboring vertices (e.g., vertices that form the edge of a polygon) and the reference plane are relatively small and constant. In contrast, in the portion of the model represented by FIG. 6B, the changes in the distance between neighboring vertices and the reference plane are relatively large and variable. The system may determine an eccentricity value for the vertices represented in the FIGS. 6A and 6B based on the amplitude and frequency with which the values change from one vertex to the next, the average or maximum distance to neighboring vertices, and the angular deviation of the surface normal of neighboring vertices.

The confidence and eccentricity values may be used to determine the amount of smoothing that should be applied to a portion of the model. For instance, if confidence in the accuracy of a portion is low and the eccentricity of the portion is high, then the portion may be heavily smoothed. In contrast, if the confidence is high and the eccentricity is low, little to no smoothing may be applied to the portion.

The extent to which portions of the model are moved during smoothing may be based on the confidence and eccentricity values. Moreover, the confidence value may be weighted to have a greater or lesser influence than the eccentricity value with respect to the distance a portion of the model is moved. By way of example only, the distance that a vertex is moved may be represented by the equation:

$$d_{moved} = d_{initial} * \text{normalize}(w_e(ev) + w_c(1-cv)), \text{ where:}$$

"$d_{moved}$" is the distance that a vertex is moved toward the nearest point on a reference shape during smoothing;

"$d_{initial}$" is the distance between the vertex and the nearest point on the reference shape prior to smoothing;

"ev" is the eccentricity value associated with the vertex and constrained such that $0 <= ev <= 1$;

"cv" is the confidence value associated with the vertex and constrained such that $0 <= cv <= 1$;

"$w_e$" is the weight to be applied to the eccentricity value;

"$w_c$" is the weight to be applied to the confidence value; and

"normalize( )" is a function that returns 0 for the lowest possible input value, 1 for the highest possible input value, and a number between 0 and 1 in linear proportion to the input value.

In that regard, a vertex may be moved onto the reference shape if the system has no confidence in the accuracy of its current location and the surrounding portion of the model is extremely eccentric. If the confidence value and eccentricity value are somewhere in the middle of their minimum and maximum values, the vertex may be moved only part of the way towards the model. Other equations and combinations of parameters may also be used. By way of example only, the weight of the eccentricity value may be inversely proportional to the confidence value, e.g., $w_e=(1-cv)$. Thus, as the system's confidence in the model increases, the relevance of eccentricity to smoothing would decrease.

FIG. 8 provides an example of how the model shown in FIG. 2 may appear after smoothing. The system may have determined that the confidence value of model portion 250 was relatively low. For example, the portion may have been generated from imagery and stenographic triangulation. The confidence value may also be low if the system determined that the image was captured in a city and that the model portion is close to ground level, and thus compared that portion of the model to a reference plane that is parallel and proximate to ground level. The system may have also determined that the eccentricity of the portion was high, e.g., there were large, frequent and variable changes in the geographic location from one vertex to the next. As a result and as shown in FIG. 8, the system may have applied a large amount of smoothing to the vertices of polygon 251 such that they are brought closer to the reference plane and neighboring vertices. If the system had greater confidence that the relatively jagged surface was accurate (e.g., model portion 260), little to no smoothing may have been applied.

The system may apply a texture to the model after smoothing. FIG. 9 is a diagram of a series of three pixels 910 that appear in an image of a geographically-located object, orientation rays 931-933 that are associated with the pixels, and texture 920 to be applied to a polygon of the model. Each square in texture 920 represents a single texel. To texture the relevant portion of the model, the system may use ray tracing to project the pixels 910 onto the model such that texels at each point of intersection have the visual characteristics of the associated pixel. The visual characteristics the texels between the intersection points may be determined based on a gradient of the visual characteristics of the texels at the points of intersection.

Users may use the system and interact with the model. By way of example only and with reference to FIG. 1, user 135 may take two panoramic images of the same geographic scene from different vantage points using camera 163 of client device 120. User 135 may upload the images to server 110 via network 160 along with geographic orientation and location data that was provided by geographic component 130 at the time the images were captured. Server 110, using one or more processors 112, may construct a textured 3D model of the surfaces of objects appearing in the images using stereographic triangulation and the geographic orientation and location data. Server 110 may provide the textured model to client device 120, whereupon it is initially displayed on display 122 from one of the vantage points from which the original images were captured. User 135 may request that the model be displayed from a different vantage point by providing a rotation command via user input 162, in which case the one or more processors of the client device may use graphic rendering techniques to display the model from the requested vantage point. In some circumstances, the model may also be provided to another client device, such as client device 171, for similar purposes.

User 135 may have a more pleasant experience when one or more techniques described herein are applied. Inaccuracies in a model may create distracting visual artifacts when the model is viewed from particular vantage points. For instance, rendering smooth surfaces as jagged may create visual artifacts that are particularly distracting to users. Rendering jagged surfaces as smooth may also create distracting artifacts, but those artifacts may be less distracting than rendering smooth surfaces as jagged. On the other hand, if a surface is indeed jagged, it will tend to look best when rendered as such. Thus, by smoothing jagged areas of the model that are likely to be inaccurate, a user may see less distracting artifacts.

Figure 10:
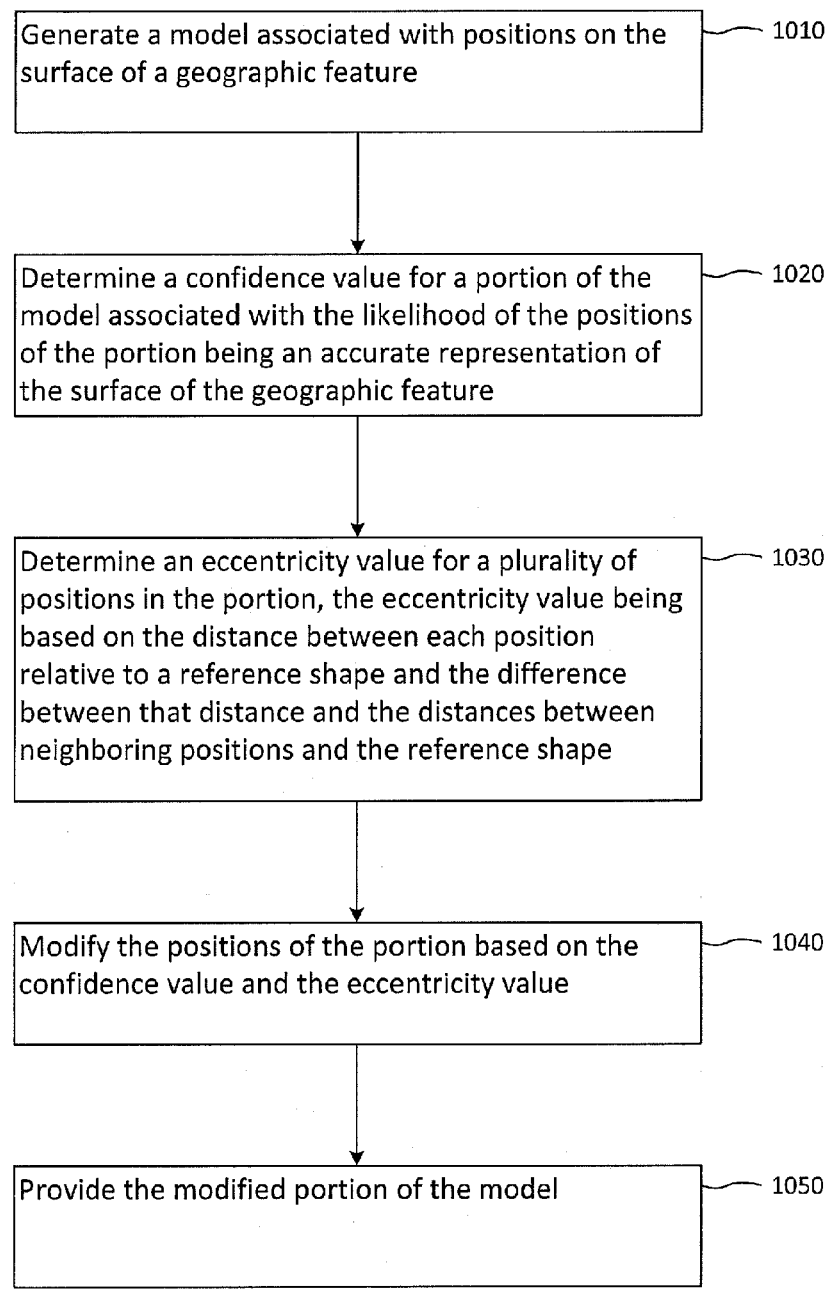
FIG. 10 is an example flow diagram in accordance with aspects of the disclosure.

FIG. 10 is a flowchart in accordance with some of the aspects described above. At block 1010, a model associated with positions on the surface of a geographic feature is generated. At block 1020, a confidence value is determined for a portion of the model associated with the likelihood of the positions of the portion being an accurate representation of the surface of the geographic feature. At block 1030, an eccentricity value is determined for a plurality of positions in the portion, the eccentricity value being based on the distance between each position relative to a reference shape and the difference between that distance and the distances between neighboring positions and the reference shape. At block 1040, the positions of the portion are modified based on the confidence value and the eccentricity value. At block 1050, the modified portion of the model is provided, e.g., for display to user or stored for future use.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A non-transitory computing-device readable storage medium on which computing-device readable instructions of a program are stored, the instructions, when executed by one or more computing devices, causing the one or more computing devices to perform a method, the method comprising:
   receiving a plurality of polygons representing a three-dimensional model of a surface of a geographic object, the three-dimensional model being based on a comparison of a first image and a second image capturing the surface of the object, where each image is captured from a different camera location;
   determining a first pixel location of the first image;
   determining a second pixel location of the second image based on visual similarity to the first pixel location;
   determining a first ray extending from the first pixel location and a second ray extending from the second pixel location, wherein each ray is associated with a camera angle of a pixel location;
   determining a first intersection location associated with the first pixel location at which the first ray intersects a surface represented by the three-dimensional model;
   determining a second intersection location associated with the second pixel location at which the second ray intersects a surface represented by the three-dimensional model;
   determining a confidence value based on the distance between the first and second intersection locations; and smoothing a portion of the three-dimensional model by decreasing distances between vertices of a plurality of the polygons of the portion based on the confidence value.

2. The medium of claim 1, wherein the polygons of the portion are textured based on the visual characteristics of the first image.

3. The medium of claim 1, wherein the polygons of the portion are textured based on a projection of the visual characteristics of the first image onto the smoothed portion.

4. The medium of claim 3, wherein a plurality of pixels of the first image are associated with data representing a camera angle relative to the pixel, and the projection of the visual characteristics is based on the camera angles.

5. The medium of claim 4, wherein the camera angle data is based on information provided by a geographic component configured to determine a geographic location and orientation of a client device comprising the camera.

6. The medium of claim 5, wherein the information provided by the geographic component comprises a cardinal direction provided by a compass and an orientation data provided by a gyroscope.

7. The medium of claim 1, wherein determining the confidence value comprises assigning a relatively higher confidence value when the first and second intersection locations are in a single polygon.

8. The medium of claim 1, wherein determining the confidence value comprises assigning a relatively lower confidence value when the first and second intersection locations are in two different polygons.

9. A method comprising:
receiving a plurality of polygons representing a three-dimensional model of a surface of a geographic object, the three-dimensional model being based on a comparison of a first image and a second image capturing the surface of the object, where each image is captured from a different camera location;
determining a first pixel location of the first image;
determining a second pixel location of the second image based on visual similarity to the first pixel location;
determining a first ray extending from the first pixel location and a second ray extending from the second pixel location, wherein each ray is associated with a camera angle of a pixel location;
determining a first intersection location associated with the first pixel location at which the first ray intersects a surface represented by the three-dimensional model;
determining a second intersection location associated with the second pixel location at which the second ray intersects a surface represented by the three-dimensional model;
determining a confidence value based on the distance between the first and second intersection locations; and
smoothing a portion of the three-dimensional model by decreasing distances between vertices of a plurality of the polygons of the portion based on the confidence value.

10. The method of claim 9, wherein the polygons of the portion are textured based on the visual characteristics of the first image.

11. The method of claim 9, wherein the polygons of the portion are textured based on a projection of the visual characteristics of the first image onto the smoothed portion.

12. The method of claim 11, wherein a plurality of pixels of the first image are associated with data representing a camera angle relative to the pixel, and the projection of the visual characteristics is based on the camera angles.

13. The method of claim 12, wherein the camera angle data is based on information provided by a geographic component configured to determine a geographic location and orientation of a client device comprising the camera.

14. The method of claim 13, wherein the information provided by the geographic component comprises a cardinal direction provided by a compass and an orientation data provided by a gyroscope.

15. The method of claim 9, wherein determining the confidence value comprises assigning a relatively higher confidence value when the first and second intersection locations are in a single polygon.

16. The method of claim 9, wherein determining the confidence value comprises assigning a relatively lower confidence value when the first and second intersection locations are in two different polygons.

17. A system comprising:
one or more computing devices, and
memory storing instructions executable by the processor and a model associated with locations on the surface of a geographic feature,
wherein the instructions comprise:
receiving a plurality of polygons representing a three-dimensional model of a surface of a geographic object, the three-dimensional model being based on a comparison of a first image and a second image capturing the surface of the object, where each image is captured from a different camera location;
determining a first pixel location of the first image;
determining a second pixel location of the second image based on visual similarity to the first pixel location;
determining a first ray extending from the first pixel location and a second ray extending from the second pixel location, wherein each ray is associated with a camera angle of a pixel location;
determining a first intersection location associated with the first pixel location at which the first ray intersects a surface represented by the three-dimensional model;
determining a second intersection location associated with the second pixel location at which the second ray intersects a surface represented by the three-dimensional model;
determining a confidence value based on the distance between the first and second intersection locations; and
smoothing a portion of the three-dimensional model by decreasing distances between vertices of a plurality of the polygons of the portion based on the confidence value.

18. The system of claim 17, wherein the polygons of the portion are textured based on the visual characteristics of the first image.

19. The system of claim 17, wherein the polygons of the portion are textured based on a projection of the visual characteristics of the first image onto the smoothed portion.

20. The system of claim 17, wherein a plurality of pixels of the first image are associated with data representing a camera angle relative to the pixel, and the projection of the visual characteristics is based on the camera angles.

* * * * *